(12) United States Patent
Yoneyama

(10) Patent No.: US 8,967,599 B2
(45) Date of Patent: Mar. 3, 2015

(54) TORQUE ARM FOR AUTOMOBILE

(75) Inventor: Kenzo Yoneyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 42 days.

(21) Appl. No.: 14/007,796

(22) PCT Filed: Mar. 27, 2012

(86) PCT No.: PCT/JP2012/057886
§ 371 (c)(1),
(2), (4) Date: Sep. 26, 2013

(87) PCT Pub. No.: WO2012/133383
PCT Pub. Date: Oct. 4, 2012

(65) Prior Publication Data
US 2014/0015177 A1    Jan. 16, 2014

(30) Foreign Application Priority Data

Mar. 31, 2011    (JP) ................................. 2011-080686

(51) Int. Cl.
*F16F 1/38*    (2006.01)
*B60F 1/00*    (2006.01)
(Continued)

(52) U.S. Cl.
CPC .......... *F16F 1/3821* (2013.01); *B29C 45/14344* (2013.01); *B29C 45/14467* (2013.01); *B29C 2045/1436* (2013.01); *B29K 2021/00* (2013.01);
(Continued)

(58) Field of Classification Search
CPC ........... F16F 15/08; F16F 1/38; F16F 1/3849; F16F 2222/04; F16F 7/1011; B62D 7/16; F16C 27/063; F16C 7/04; B60K 5/1241; B60K 5/1266

USPC ........... 267/141.1, 141.4, 292, 140.12, 140.3, 267/140.5, 140.4; 74/579 R, 579 E; 280/124.13, 124.166
See application file for complete search history.

(56) References Cited

U.S. PATENT DOCUMENTS 4,706,946 A * 11/1987 Thorn et al. .................. 267/292
2009/0230601 A1 * 9/2009 Lenda ........................ 267/141.1

FOREIGN PATENT DOCUMENTS

FR    2805869    *  9/2007
JP    S57-100640 U    6/1982
(Continued)

*Primary Examiner* — Anna Momper
*Assistant Examiner* — San Aung
(74) *Attorney, Agent, or Firm* — Carrier Blackman & Associates, P.C.; Joseph P. Carrier; William D. Blackman

(57) ABSTRACT

A torque arm for an automobile is configured so that the axis of a first bush and the axis of a second bush are arranged so as to intersect each other. The torque arm includes a first outer tube, a second outer tube, and an outer-tube connection section which are each divided into halves. A rubber introduction opening connecting to a second space is formed in the introduction portion of the second outer tube. A rubber material poured toward the upper flat section of an upper outer-tube connection section, which is one of the halves of the outer-tube connection section, is led to the rubber introduction opening while being guided by the upper flat section. The led rubber material is filled into the second space after passing through the rubber introduction opening, and a second rubber elastic body is formed by the rubber material filled into the second space.

3 Claims, 11 Drawing Sheets

(51) Int. Cl.
*B29C 45/14* (2006.01)
*B60K 5/12* (2006.01)
*B60K 1/00* (2006.01)
*B29K 21/00* (2006.01)

(52) U.S. Cl.
CPC ............. *B60K 5/1241* (2013.01); *F16F 1/3849* (2013.01); *B60K 1/00* (2013.01)
USPC ..... 267/141.1; 267/292; 74/579 E; 74/579 R; 280/124.13; 280/124.166

(56) References Cited

FOREIGN PATENT DOCUMENTS

| | | | |
|---|---|---|---|
| JP | S60-56841 U | | 4/1985 |
| JP | 2003-206991 A | | 7/2003 |
| JP | 2005-163844 A | | 6/2005 |
| JP | 2007-078050 A | | 3/2007 |
| JP | 2007057070 | * | 3/2007 |
| JP | 2008249113 | * | 10/2008 |
| JP | 2009234300 | * | 10/2009 |
| JP | 2010038195 | * | 2/2010 |

* cited by examiner

TORQUE ARM FOR AUTOMOBILE

TECHNICAL FIELD

The present invention relates to a torque arm for an automobile or automotive vehicle capable of supporting a power plant, functioning as a power source of the vehicle, by connecting the power plant to a vehicle body.

BACKGROUND ART

In automobiles or automotive vehicles, a power source is connected to a vehicle body via a torque arm. The torque arm includes a first bush connected to the vehicle body, a second bush connected to the power source, and a connection section interconnecting the first bush and the second bush.

In the first bush, a first inner tube is disposed within and coaxially with a first outer tube, and a first rubber-made elastic member is disposed in a first space between the first outer tube and the first inner tube. In the second bush, a second inner tube is disposed within and coaxially with a second outer tube, and a second rubber-made elastic member is disposed in a second space between the second outer tube and the second inner tube. The first outer tube of the first bush and the second outer tube of the second bush are interconnected to constitute the torque arm.

Among the conventionally-known torque arms is one in which the first and second outer tubes and the connection section are each divided into two halves to provide a pair of half members (see, for example, Patent Literature 1). In manufacturing such a torque arm, first, the pair of half members are superposed on each other to form the first and second outer tubes and the connection section. Then, with the pair of half members superposed on each other, the first inner tube is positioned within the first outer tube, and the second inner tube is positioned within the second outer tube.

Then, the pair of half members superposed on each other and the first and second inner tubes are inserted into a cavity of a mold. Then, a rubber material is filled into the cavity, and the filled rubber material is molded through vulcanization (i.e., molded by cross-linking). Then, with the vulcanization-molded rubber, a first rubber-made elastic member is formed in the first space to provide the first bush, while a second rubber-made elastic member is formed in the second space to provide the second bush. Simultaneously, the pair of half members are bonded to each other by the vulcanized rubber. In this manner, vulcanization-molding of the torque arm is completed.

Prior Art Literature

Patent Literature 1: Japanese Patent Application Laid-Open Publication No. 2005-163844

SUMMARY OF INVENTION

Technical Problem

Normally, to vulcanization-mold the torque arm, it is preferable that a pair of rubber material filling passages (runners) be provided in the mold so that the rubber material can be smoothly filled into the first and second spaces through the respective filling passages. Thus, with the torque arm disclosed in Patent Literature 1, it is necessary that the first and second bushes be disposed with their respective axis lines extending parallel to each other, in order to associate the first and second spaces with the two rubber material filling passages.

However, some automotive vehicles may require a torque arm where the first and second bushes are disposed with their respective axis lines extending in such directions as to intersect each other. Therefore, there has been a demand for putting to practical use a technique that permits vulcanization-molding of a torque arm where the first bush and the second bush are disposed with their respective axis lines extending in such directions as to intersect each other and with the axis line of the first bush extending substantially vertically.

It is therefore an object to provide a torque arm for an automobile which can be vulcanization-molded in such a manner that the first and second bushes are disposed with their respective axis lines extending in such directions as to intersect each other.

Solution to Problem

According to claim 1, there is provided an improved torque arm for an automobile, which comprises: a first bush including a first rubber-made elastic member provided in a first space between a first outer tube and a first inner tube; a second bush including a second rubber-made elastic member provided in a second space between a second outer tube and a second inner tube, the second bush extending in such a direction as to intersect the first bush, one of the first bush and the second bush being connected to a power source, other of first bush and the second bush being connected to a vehicle body of the automobile; and a connection section including an outer tube connection section that connects the second outer tube of the second bush to the first outer tube of the first bush, the outer tube connection section having a flat portion extending in such a direction as to intersect an axis line of the first bush and disposed parallel to an axis line of the second bush, characterized in that: the first outer tube, the second outer tube and the outer tube connection section are each divided in two halves; respective one halves of the first outer tube, the second outer tube and the outer tube connection section divided in two halves together constitute a first half member; respective other halves of the first outer tube, the second outer tube and the outer tube connection section divided in halves together constitute a second half member; the second outer tube has a rubber introduction opening formed in an introduction part thereof adjacent to the flat portion of the outer tube connection section, the rubber introduction opening being in communication with the second space; and with the first half member and the second half member superposed on each other to thereby constitute the first outer tube, the second outer tube and the outer tube connection section, the outer tube connection section is covered with a rubber material fed to the flat portion of the outer tube connection section in such a direction as to intersect the flat portion, but also the rubber material is directed along the flat portion to the rubber introduction opening and filled into the second space via the rubber introduction opening, so that the second rubber-made elastic member is formed by the rubber material filled into the second space.

The second bush is disposed to extend in such a direction as to intersect the first bush. An opening portion of the second space is shifted in phase from an opening portion of the first space by about 90°. Thus, if the opening portion of the first space is positioned opposed to a rubber material filling passage (runner), the opening portion of the second space cannot be opposed to the rubber material filling passage.

Thus, in the invention of claim 1, the flat portion of the connection section is disposed parallel to the axis line of the second bush, and thus, the flat portion of the connection section can be disposed parallel to the opening portion of the first space. Therefore, the opening portion of the first space and the flat portion can be opposed to the rubber material filling passage, so that the rubber material can be not only filled into the first space but also directed to the flat portion. Further, the rubber introduction opening is formed in the introduction part of the second outer tube adjacent to the flat portion. Thus, the rubber material directed to the flat portion can be directed along the flat portion to the rubber introduction opening, via which the rubber material can be filled into the second space.

Preferably, as recited in claim 2, the outer tube connection section is formed in such a manner that the flat portion has a narrowed portion formed therein near the second bush by gradually decreasing in width dimension in a direction from the first bush to the second bush.

Further, preferably, as recited in claim 3, the second outer tube of the second bush is formed to have a smaller diameter than the first outer tube of the first bush, and the second bush is connected to the power source while the first bush is connected to the vehicle body.

Advantageous Effects of Invention

In the invention recited in claim 1, the flat portion of the connection section is disposed parallel to the axis line of the second bush, and thus, the flat portion of the connection section can be disposed parallel to the opening portion of the first space. Therefore, the opening portion of the first space and the flat portion can be opposed to the rubber material filling passage, so that the rubber material can be not only filled into the first space but also directed to the flat portion.

Further, the rubber introduction opening communicating with the second space is formed in the introduction part of the second outer tube adjacent to the flat portion. Thus, the rubber material directed to the flat portion can be directed along the flat portion to the rubber introduction opening, via which the rubber material can be filled into the second space.

By the rubber material being filled into the first and second spaces, a first rubber-made elastic member can be formed (molded) in the first space, and a second rubber-made elastic member can be formed (molded) in the second space. In this manner, a torque arm for an automobile can be vulcanization-molded (i.e., molded by cross-linking) in which the axis line of the first bush and the axis line of the second bush extend in such directions as to intersect each other.

Such vulcanization-molding of the first rubber-made elastic member and second rubber-made elastic member can solidify the bond between molecules in each of the first and second rubber-made elastic members but also increase the elasticity and tensile strength of the first and second rubber-made elastic members.

In the invention recited in claim 2, the outer tube connection section is formed in such a manner that the flat portion has a narrowed portion formed therein near the second bush by gradually decreasing in width dimension in a direction from the first bush to the second bush. With the width dimension of the flat portion gradually decreasing in the direction from the first bush to the second bush, the torque arm of the present invention can be adjusted to a variety of types of automobiles or automotive vehicles, and thus, the application of the torque arm can be significantly increased.

As means for filling the rubber material into the second space, it is conceivable to form a rubber material introducing passage between the two halves of the connection section so that the rubber material injected into the first space can be directed to the second space via the rubber material introducing passage. However, the rubber material introducing passage has a smaller width dimension than the flat portion. Thus, if the flat portion is formed in a small width dimension, the cross section of the flow passage of the rubber material introducing passage decreases in the direction from the first bush toward the second bush and becomes particularly small in the narrowed portion. Therefore, it would be difficult to smoothly guide the rubber material, having been directed from the first space to the introducing passage, toward the second space.

To avoid such an inconvenience, the torque arm recited in claim 2 has the rubber introduction opening formed in the introduction part of the second outer tube adjacent to the flat portion so that the rubber material can be directed through the rubber introduction opening into the second space. Thus, even in the torque arm where the width dimension of the flat portion gradually decreases in the direction from the first bush to the second bush, the rubber material can be smoothly and reliably directed through the rubber introduction opening into the second space.

In the invention recited in claim 3, the second outer tube of the second bush is formed to have a smaller diameter than the first outer tube of the first bush, and the second bush is connected to the power source (power plant) while the first bush is connected to the vehicle body. The second bush is disposed to extend in such a direction as to intersect the second bush. Thus, the second bush is connected to the power source with its axis line extending parallel to the power plant.

Thus, by the second bush being formed to have a smaller diameter, a lower portion of the second bush can be located at a high position. Normally, the lower portion of the second bush is located lower than a lower portion of the power plant. Thus, by the lower portion of the second bush being located at the high position, a minimum ground height of sections around the power plant can be set relatively high.

DESCRIPTION OF EMBODIMENTS

Now, a preferred embodiment of the present invention will be described hereinbelow with reference to the accompanying drawings.

Embodiment

Figure 1:
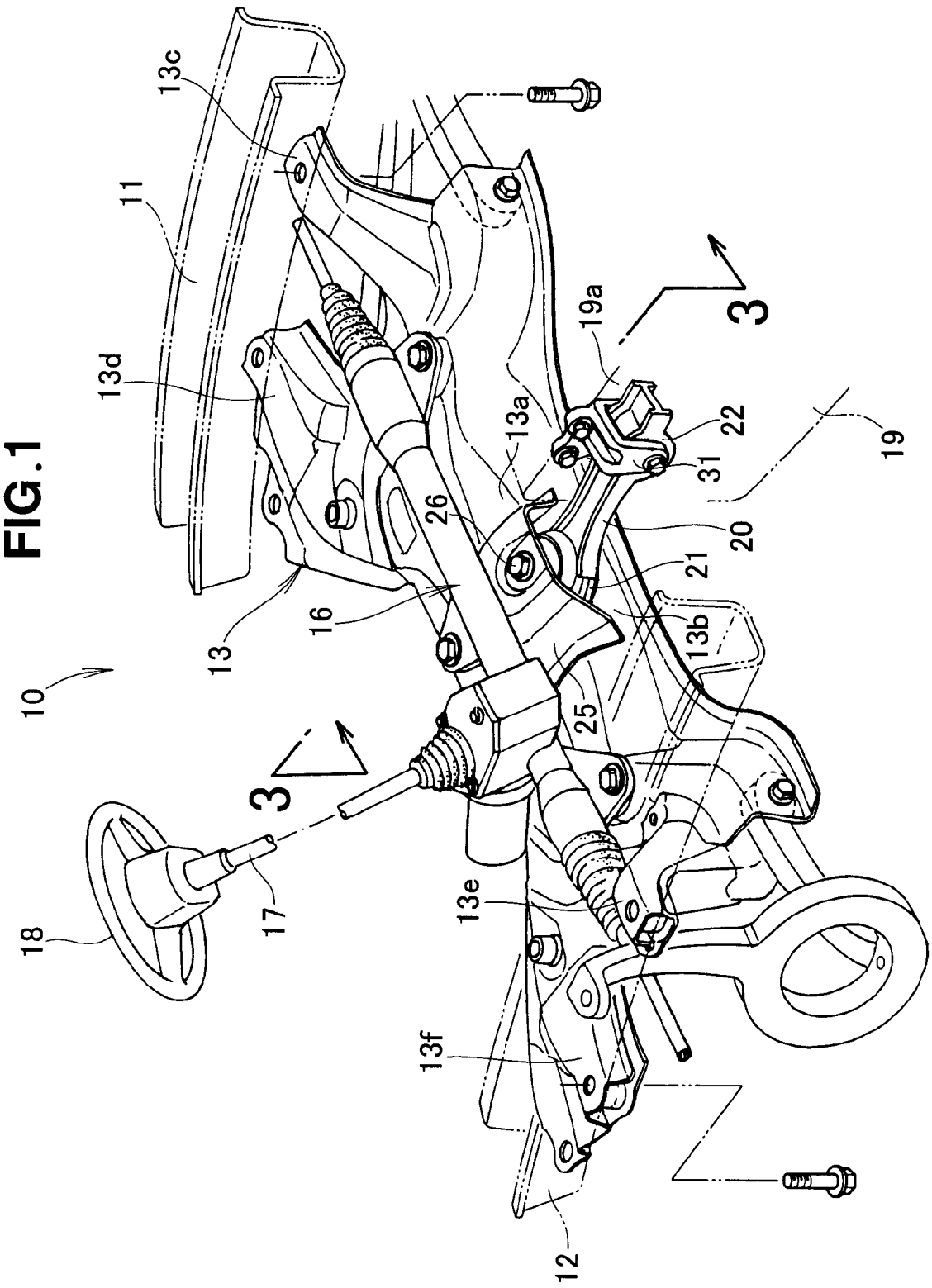
FIG. 1 is a perspective view showing a front vehicle body structure provided with a torque arm according to a preferred embodiment of the present invention.

As shown in FIG. 1, a front vehicle body structure 10 of an automobile or automotive vehicle includes: left and right side frames 11 and 12 extending in a front-rear direction of the vehicle body; a front sub frame (vehicle body) 13 mounted beneath the left and right side frames 11 and 12: a steering gearbox 16 mounted on an upper portion 13a of the front sub frame 12; and a torque arm 20 interconnecting the front sub frame 13 and a power plant (power source) 19.

The front sub frame 13, which has a substantially rectangular shape as viewed in top plan, has left front and rear mounting sections 13c and 13d on its left end portion and right front and rear mounting sections 13e and 13f on its right end portion. The left front and rear mounting sections 13c and 13d are fixed to the left side frame 11. The right front and rear mounting sections 13e and 13f are fixed to the right side frame 12.

The steering box 16 is a cylindrical case accommodating therein a steering gear (not shown) etc. The steering box 16 is mounted on the upper portion 13a of the front sub frame 13 to extend in a vehicle width direction. A steering wheel 18 is mounted on a steering shaft 17 extending from the steering box 16.

A wall section 19a of the power plant 19 is connected via the torque arm 20 to a middle region 13b, in the vehicle with direction, of the upper portion 13a of the front sub frame 13. The power plant 19 is, for example, in the form of an engine/transmission unit where the engine and the transmission are provided as an integral unit and disposed laterally between the left and right side frames 11 and 12. The power plant 19 is fixed to the left side frame 11 via a left mounting bracket and fixed to the right side frame 12 via a right mounting bracket.

Figure 2:
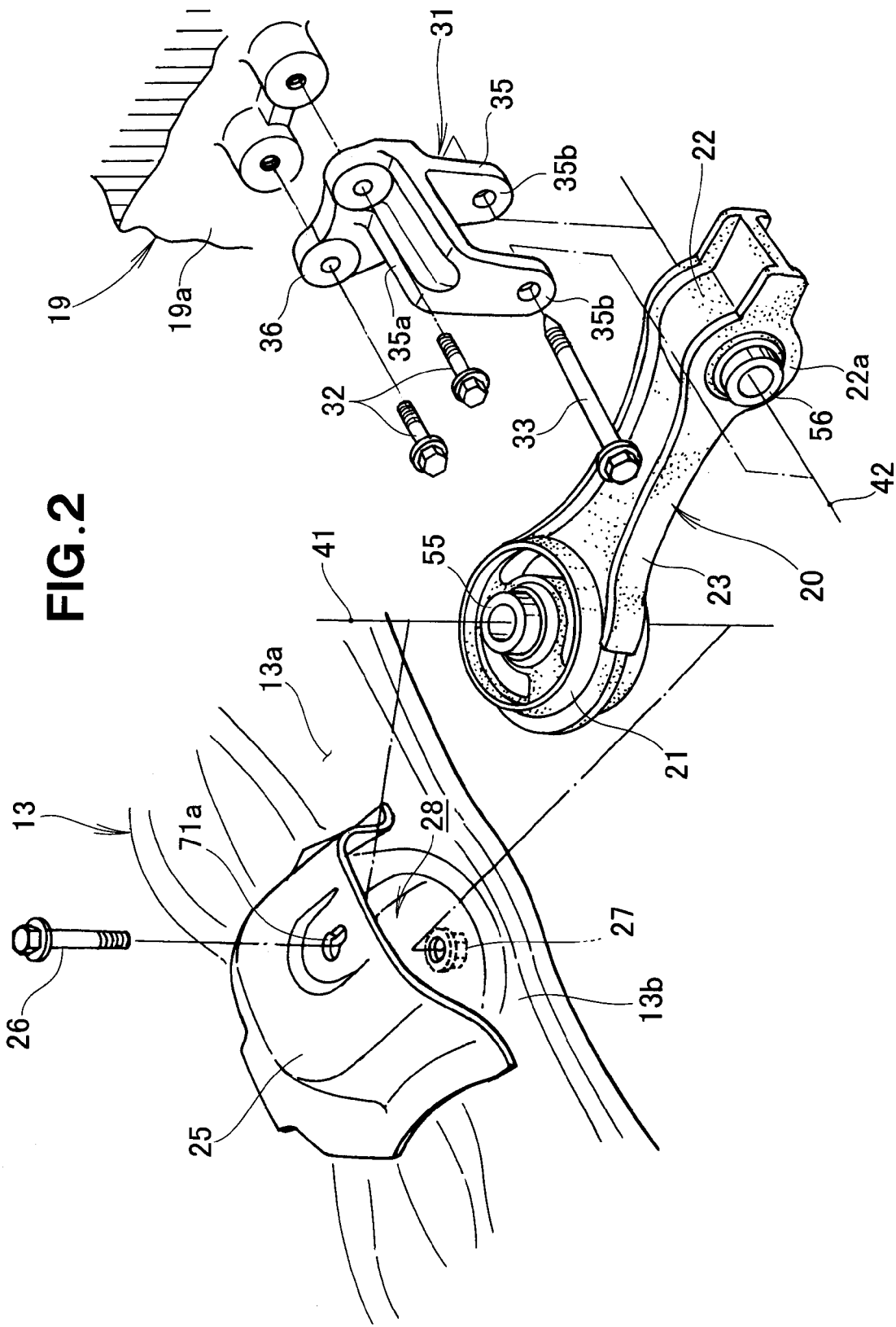
FIG. 2 is an exploded perspective view showing the relationship among the torque arm, a front sub frame and a power plant shown in FIG. 1.
Figure 3:
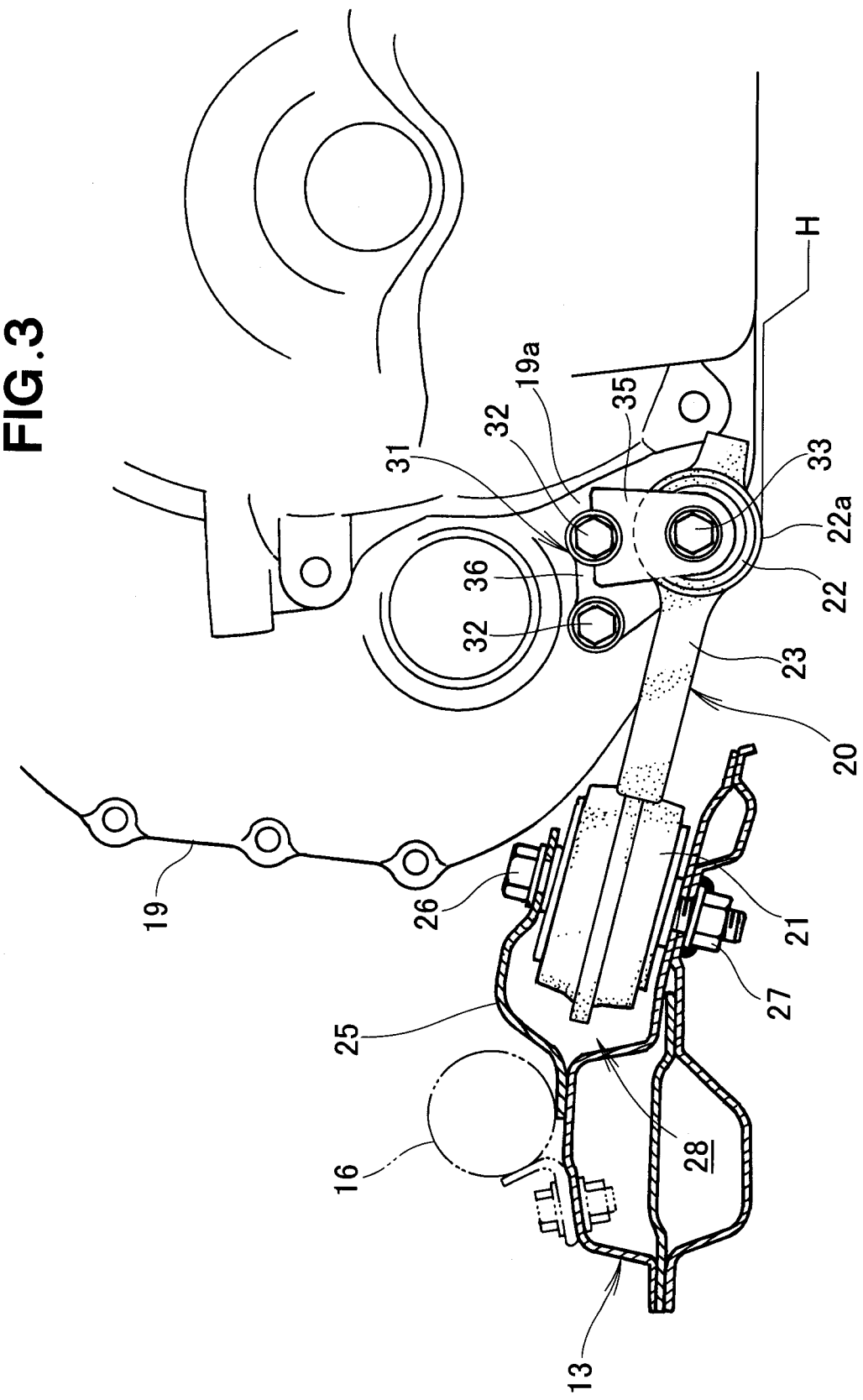
FIG. 3 is a sectional view taken along line 3-3 of FIG. 1.

As shown in FIGS. 2 and 3, a preferred embodiment of the torque arm 20 includes: a first bush (large bush 21) fixed to the front sub frame 13; a second bush (small bush) 22 fixed to the power plant 19; and a connection section 23 interconnecting the first bush 21 and the second bush 22.

More specifically, the first bush 21 is fixed to the front sub frame 13 and a rear support bracket 25 by means of a bolt 26, and the second bush 22 is fixed to the power plant 19 via a front support bracket 31 by means of bolts 32 and 33. In this manner, the front sub frame 13 and the power plant 19 are interconnected via the torque arm 20. With the front sub frame 13 and the power plant 19 interconnected via the torque arm 20 like this, displacement of the power plant 19 can be effectively prevented.

The rear support bracket 25 is provided on the middle region 13b of the upper portion 13a of the front sub frame 13. With the rear support bracket 25 is provided on the middle region 13b of the upper portion 13a like this, a space 28 accommodating therein the first bush 21 is defined between the middle region 13b and the rear support bracket 25.

With the first bush 21 accommodated in the space 28, the first bush 21 is connected to the middle region 13b and the rear support bracket 25 by means of the bolt 26 and a nut 27. Because the rear support bracket 25 is provided on the middle region 13b of the front sub frame 13, the first bush 21 is connected to the front sub frame 13 via the rear support bracket 25 by means of the bolt 26 and the nut 27.

The front support bracket 31 includes a support arm 35 for supporting the second bush 22 of the torque arm 20, and a mounting bracket 36 for mounting the support arm 35 on the wall section 19a of the power plant 19.

The support arm 35 is formed in an inverted U shape with a top portion 35a extending in the vehicle width direction and a pair of arm portions 35b provided on opposite end portions of the top portion 35a. The second bush 22 of the torque arm 20 is connected to the pair of arm portions 35b by means of a bolt 33.

Of the front support bracket 31, the mounting bracket 36 is located adjacent to the power plant 19 (wall section 19a). The mounting bracket 36 is fastened to the wall section 19a of the power plant 19 by means of a pair of bolts 32.

Namely, in the torque arm 20, the first bush 21 is connected to the front sub frame 13, and the second bush 22 is connected to the power plant 19. Thus, the power plant 19 is supported by the front sub frame 13 via the torque arm 20, so that displacement of the power plant 19 can be prevented by the torque arm 20.

The second bush 22 has an outer tube (i.e., second outer tube) 65 (see FIG. 5) smaller in diameter than an outer tube (i.e., first outer tube) 61 of the first bush 21. Further, the second bush 22 is disposed with its axis line 42 extending in such a direction as to intersect the axis line 41 of the first bush 21, and the axis line 41 of the first bush 21 extends substantially vertically.

Namely, the second bush 22 is connected to the power plant 19 with its axis line 42 extending substantially horizontally. Thus, by the second outer tube 65 of the second bush 22 being formed to have a small diameter, a lower portion 22a of the second bush 22 can be located at a high position H. Here, the lower portion 22a of the second bush 22 is located lower than a lower portion of the power plant 19. Thus, by the lower portion 22a of the second bush 22 being located at the high position H, a minimum ground height of sections around the power plant 19 can be set relatively high.

The following paragraphs describe in greater detail the torque arm 20.

Figure 4:
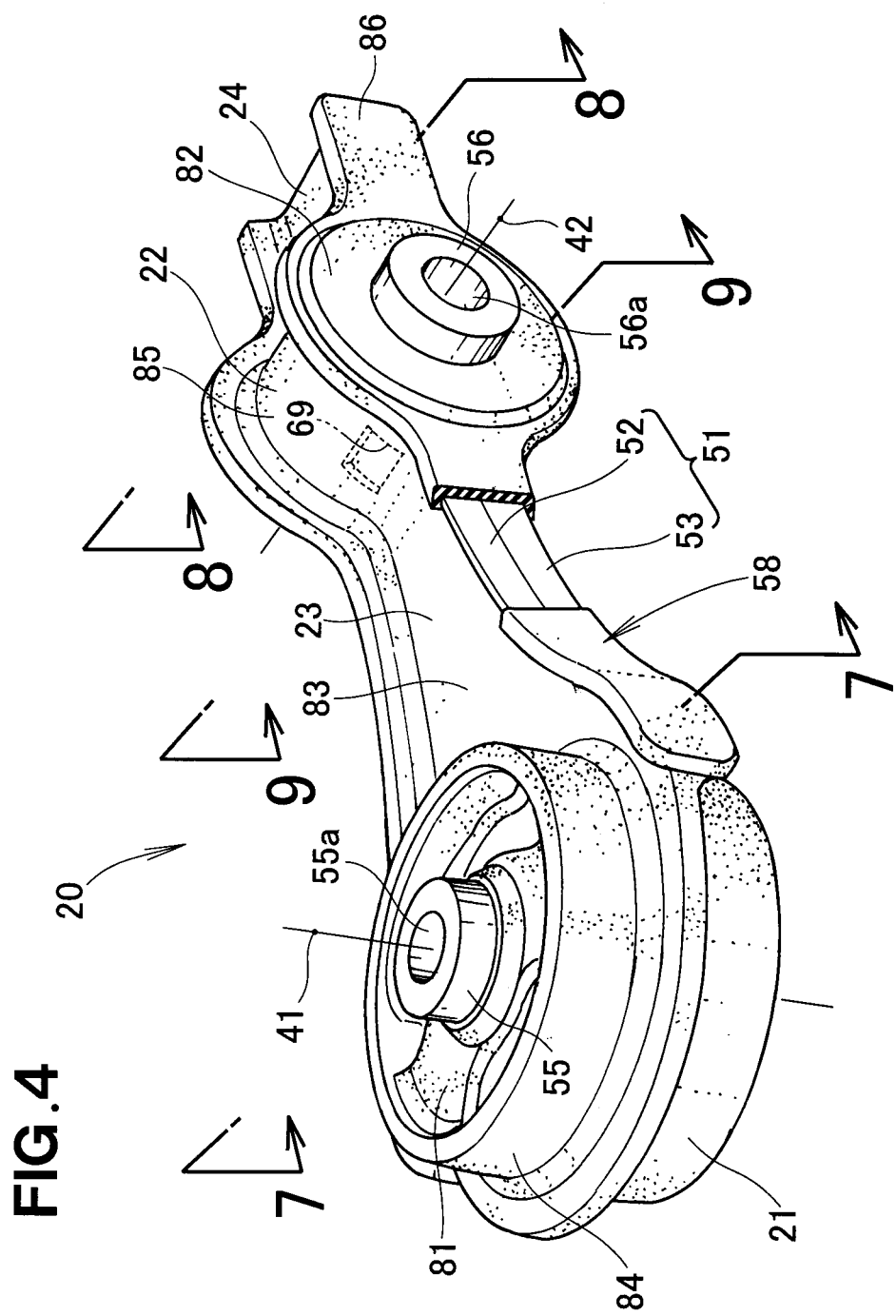
FIG. 4 is a perspective view of the torque arm shown in FIG. 2.

As shown in FIG. 4, the torque arm 20 includes the first bush 21, the second bush 22, the connection section 23 and a protruding section 24. The torque arm 20 is constructed of four main members: a frame member 51 for securing rigidity of the torque arm 20; first and second inner tubes 55 and 56 provided on the frame member 51; and a rubber-made elastic member 58 for integrally joining the first and second inner tubes 55 and 56 to the connection section 23.

Figure 5:
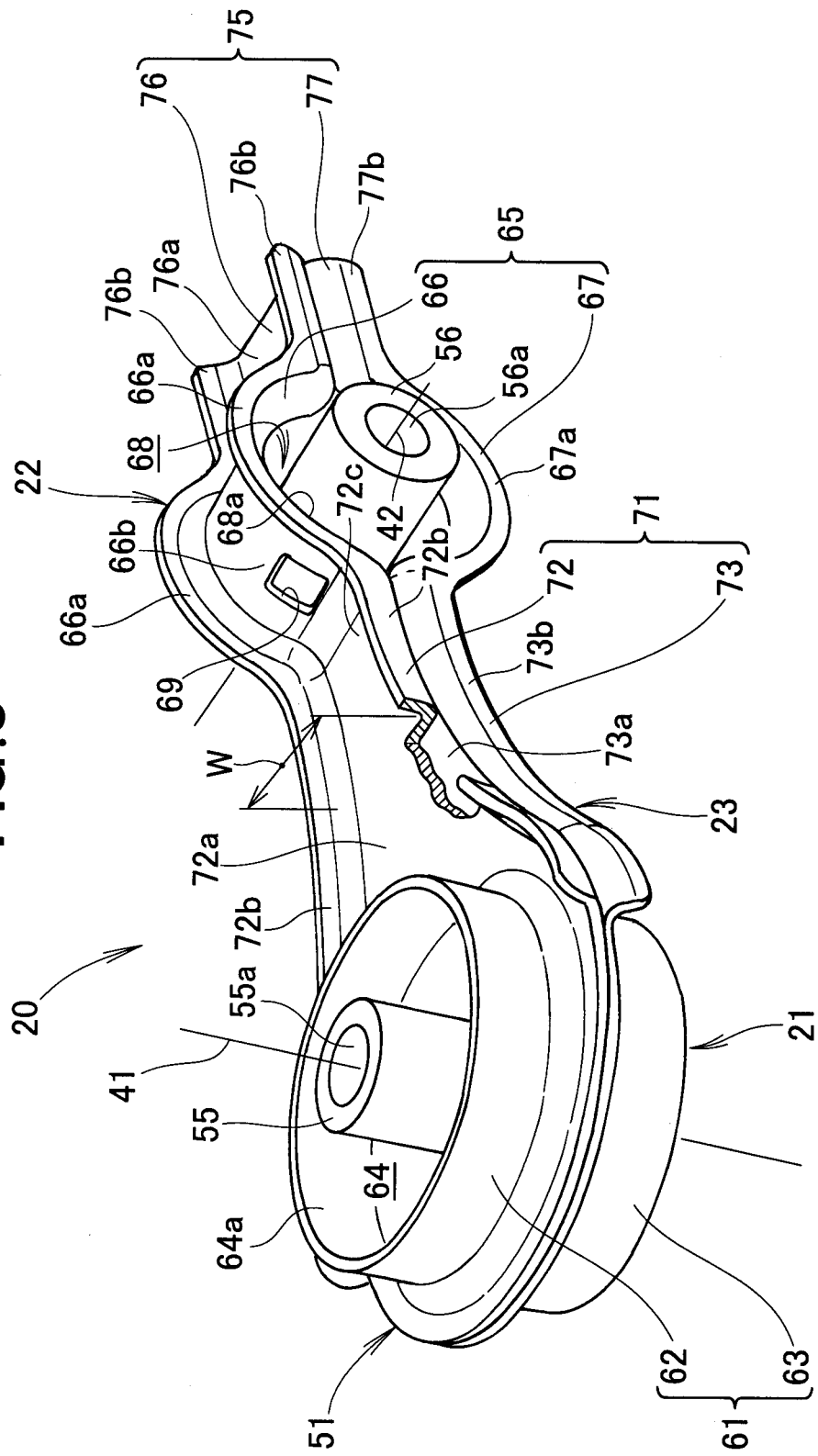
FIG. 5 is a perspective view showing upper and lower half members of the torque arm shown in FIG. 4.
Figure 6:
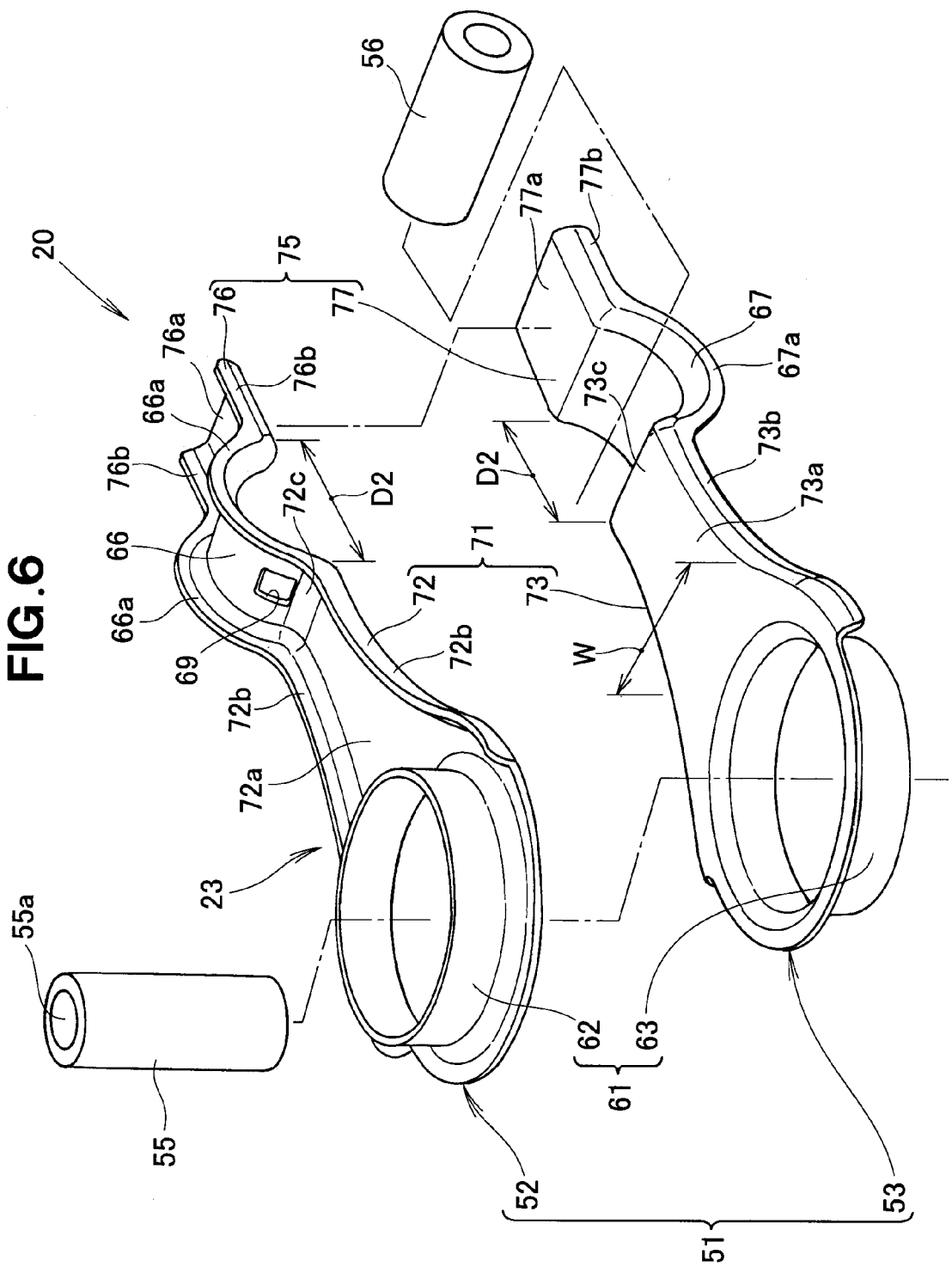
FIG. 6 is an exploded perspective view showing the upper and lower half members of the torque arm shown in FIG. 5.

Further, as shown in FIGS. 5 and 6, the frame member 51 includes: the first outer tube 61 constituting the outer tube of the first bush 21; the second outer tube 65 constituting the outer tube of the second bush 22; an outer tube connection section 71 interconnecting the first outer tube 61 and the second outer tube 65; and an outer tube protrusion section 75. The frame member 51 is vertically divided in an upper half member (first half member) 52 and a lower half member (second half member) 53. Namely, the frame member 51 comprises the upper half member 52 and the lower half member 53.

Because the frame member 51 is divided in the upper half member 52 and the lower half member 53, the first inner tube 61 is halved in a first upper outer tube (one half section) 62 and a first lower outer tube (the other half section) 63, and the second inner tube 65 is halved in a second upper outer tube (one half section) 52 and a second lower outer tube (the other half section) 67.

Further, because the frame member 51 is divided in the upper half member 52 and the lower half member 53 as noted above, the outer tube connection section 71 is halved in an upper outer connection section (one half section) 72 and a lower outer connection section (the other half section) 73, and in addition, the outer tube protrusion section 75 is halved in an upper outer tube protrusion section 76 and a lower outer tube protrusion section 77.

Figure 7:
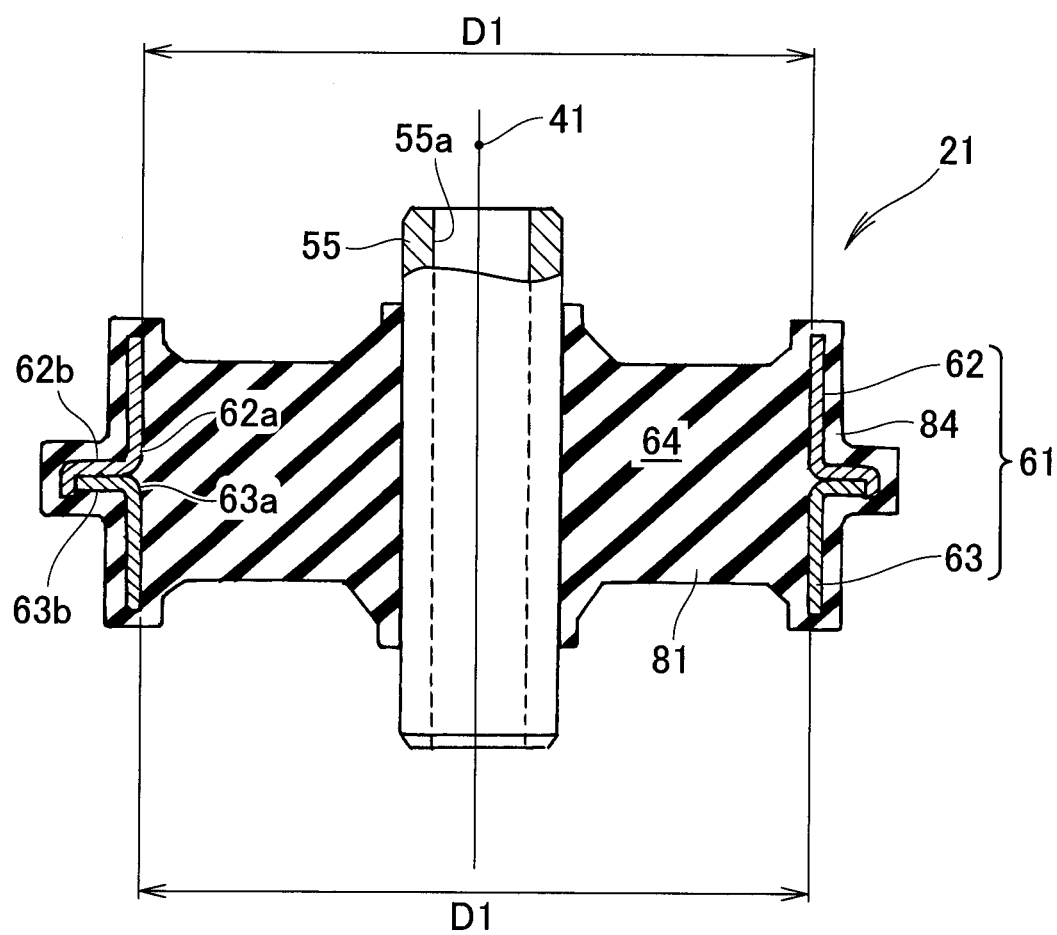
FIG. 7 is a sectional view taken along line 7-7 of FIG. 4.

The first upper outer tube 62 and the first lower outer tube 63 provided by the vertical division of the first outer tube 61 are vertically symmetrical members. As shown in FIG. 7, the first upper outer tube 62, which is a circular tube of a diameter D1, has a flange 62b on its lower end portion 62a, and the lower upper outer tube 63, which is also a circular tube of a diameter D1, has a flange 63b on its lower end portion 63a.

With the flange 62b of the first upper outer tube 62 and the flange 63b of the first lower outer tube 63 superposed on each other, the first upper outer tube 62 and the first lower outer tube 63 are disposed coaxially with each other. The first upper outer tube 62 and the first lower outer tube 63 disposed coaxially with each other like this together constitute the first outer tube 61 of the diameter D1 disposed in a substantially vertical orientation.

Figure 8:
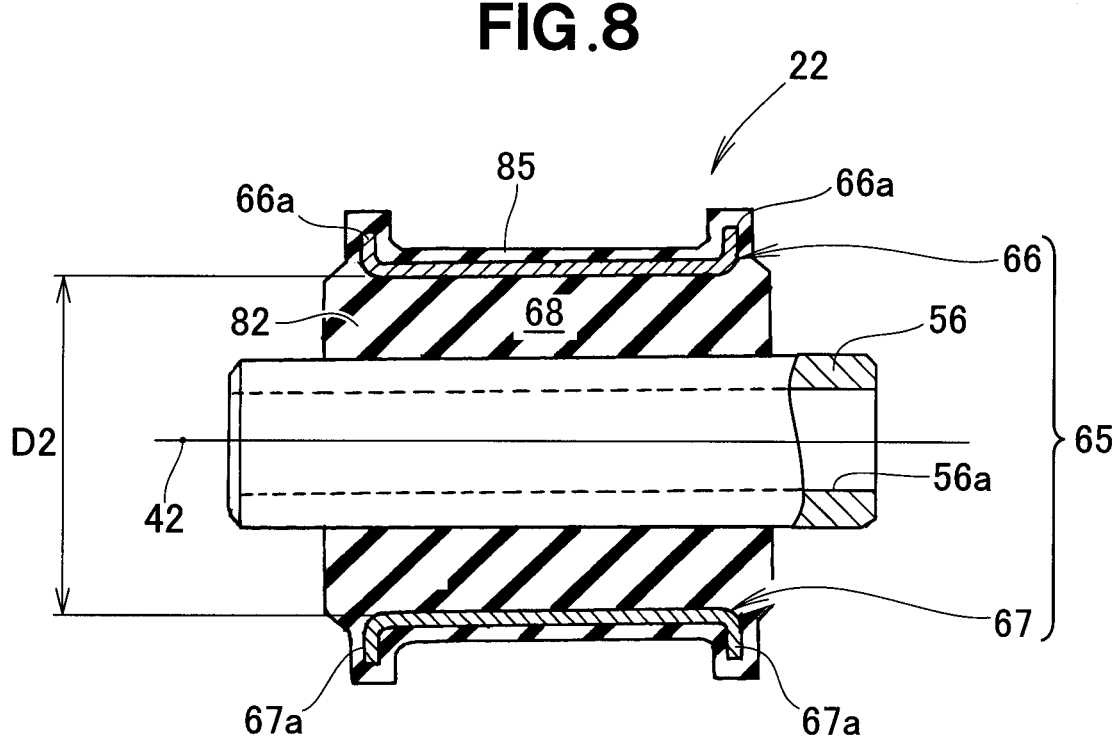
FIG. 8 is a sectional view taken along line 8-8 of FIG. 4.

As shown in FIGS. 5, 6 and 8, a second upper outer tube 66 and a second lower outer tube 67 provided by the vertical division of the second outer tube 65 are vertically symmetrical members. The second upper outer tube 66 is a semi-circular tube having a diameter D2 by bulging upwardly, and the second upper outer tube 66 has upward protrusions 66a formed on its opposite end portions. Further, a rubber introduction opening 69 is formed in an introduction part 66b of the second upper outer tube 66. The introduction part 66b is a part of the second upper outer tube 66 adjacent to an upper flat portion 72a of the upper outer connection section 72.

The rubber introduction opening 69 is an opening that is located near the upper flat portion 72a of the upper outer connection section 72 to allow a space defined by the upper flat portion 72a to communicate with a second surface space 68. With the rubber introduction opening 69 provided near the upper flat portion 72a of the upper outer connection section 72, a rubber material 88 can be directed along the upper flat portion 72a to the rubber introduction opening 69 (see FIG. 12).

Further, as shown in FIGS. 6 and 8, the second lower outer tube 67 is a semi-circular tube having a diameter D2 by bulging downwardly, and the second lower outer tube 67 has downward protrusions 67a formed on its opposite end portions and protruding downward.

As shown in FIG. 8, the second upper outer tube 66 and the second lower outer tube 67 superposed on each other together constitute the second outer tube 65 that has an annular cross-sectional shape of the diameter D2 and is disposed in a substantially horizontal orientation. The second outer tube 65 has the pair of upward protrusions 66a on its upper half section and the pair of downward protrusions 67a on its lower half section.

Figure 9:
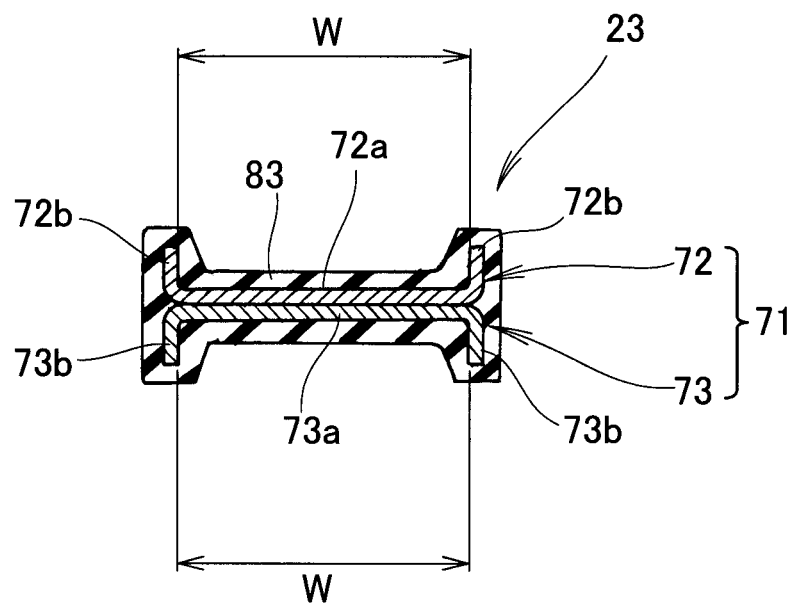
FIG. 9 is a sectional view taken along line 9-9 of FIG. 4.

As shown in FIG. 9, the upper outer tube connection section (one half section) 72 and the lower outer tube connection section (the other half section) 73 provided by the vertical division of the outer tube connection section 71 are vertically symmetrical members. Further, as shown in FIG. 5, the upper outer tube connection section 72 tapers in such a manner that a width dimension W of the upper flat portion gradually decreases in a direction from the first upper outer tube 62 toward the second upper outer tube 66. Because the width dimension W of the upper flat portion decreases in the direction from the first upper outer tube 62 toward the second upper outer tube 66, a narrowed portion (upper narrowed portion) 72c is formed in the upper outer tube connection section 72 near the second upper outer tube 66. The upper outer tube connection section 72 has a substantially U cross-sectional shape with upward protrusions 72b protruding upward from opposite side edge portions of the upper flat portion 72a (see FIG. 9).

Similarly to the upper outer tube connection section 72, the lower outer tube connection section 73 tapers in such a manner that a width dimension W of a lower flat portion 73a gradually decreases in a direction from the first lower outer tube 63 toward the second lower outer tube 67. Because the width dimension W of the lower flat portion 73a decreases as above, a narrowed portion 73c is formed in the lower outer tube connection section 73 near the second lower outer tube 67. As shown in FIG. 9, the lower outer tube connection section 73 has a substantially U cross-sectional shape with downward protrusions 73b protruding downward from opposite side edge portions of the lower flat portion 73a.

Namely, the upper and lower outer tube connection section 72 and 73 each have a substantially U cross-sectional shape. Thus, the outer tube connection section 71 of a substantially U cross-sectional shape is formed with the upper and lower outer tube connection section 72 and 73 superposed with each other.

Further, as shown in FIGS. 5 and 6, the upper and lower outer tube connection section 72 and 73 can be formed in such a manner that the width dimension W of the upper and lower flat portions 72a and 73a gradually decreases. Thus, the shape of the upper and lower outer tube connection section 72 and 73 and hence the shape of the torque arm 20 may be determined from a wide range of selections. In this way, the torque arm 20 can be adjusted to a variety of types of vehicles and the application of the torque arm 20 can be significantly increased.

The upper outer tube protrusion section 76 and the lower outer tube protrusion section 77 provided by the vertical division of the outer tube protrusion section 75 are vertically symmetrical members. The upper outer tube protrusion section 76 has upward protrusions 76b formed on its opposite end portions and protruding upward. Thus, similarly to the upper outer tube connection section 72, the upper outer tube protrusion section 76 is formed in a substantially U cross-sectional shape with the upper flat portion 76a and the pair of upward protrusions 76b.

The lower outer tube protrusion section 77 has downward protrusions 77b formed on its opposite end portions and protruding downward. Thus, similarly to the lower outer tube connection section 73, the lower outer tube protrusion section 77 is formed in a substantially U cross-sectional shape with the lower flat portion 77a and the pair of downward protrusions 77b. Thus, the upper outer tube protrusion section 76 and the lower outer tube protrusion section 77 superposed on each other together constitute the outer tube protrusion section 75 of a substantially H cross-sectional shape.

Namely, the upper half member 52 is integrally formed with the first upper outer tube 62, second upper outer tube 66, upper outer tube connection section 72 and upper outer tube protrusion section 63. The lower half member 53 is integrally formed with the first lower outer tube 63, second lower outer tube 67, lower outer tube connection section 73 and lower outer tube protrusion section 77.

With the upper half member 52 and the lower half member 53 superposed on each other, the first upper outer tube 62 and the first lower outer tube 63 together constitute the first outer tube 61. The first inner tube 55 is disposed within and coaxially with the first outer tube 61, so that the first space 64 is defined between the first outer tube 61 and the first inner tube 55.

By being formed in a circular tubular shape, the first inner tube 55 has a hollow portion (i.e., first hollow portion) 55*a* for passage therethrough of the bolt 26 (FIG. 2). As shown in FIG. 2, the first inner tube 55 is connected to the middle region 13*b* by the bolt 26 being passed through the first hollow portion 55*a* and fastened to the middle region 13*b* of the front sub frame 13.

Further, as shown in FIGS. 5 and 6, with the upper half member 52 and the lower half member 53 superposed on each other, the second upper outer tube 66 and the second lower outer tube 67 together constitute the second outer tube 65. The second inner tube 56 is disposed within and coaxially with the second outer tube 65, so that the second space 68 is defined between the second outer tube 65 and the second inner tube 56.

An opening portion of the second space 68 is shifted in phase from an opening portion 64*a* of the first space 64 by about 90°. Thus, if the opening portion 64*a* of the first space 64 is positioned opposed to a first runner 96 (see FIG. 12), the opening portion 68*a* of the second space 68 cannot be opposed to a second runner 97 (see FIG. 12). Thus, in the instant embodiment, as noted above, the rubber introduction opening 69 is formed in the introduction part 66*b* of the second upper outer tube 66 and opposed to the second runner 97.

By being formed in a circular tubular shape, the second inner tube 56 has a hollow portion (second hollow portion) 56*a* for passage therethrough of the bolt 33 (FIG. 2). As shown in FIG. 2, the second inner tube 56 is connected to the front support bracket 31 by the bolt 33 being passed through the second hollow portion 56*a* and fastened to the front support bracket 31.

Further, as shown in FIGS. 4 and 5, the rubber-made elastic member 58 includes a first rubber-made elastic member 81 provided in the first space 64 between the first outer tube 61 and the first inner tube 55, a second rubber-made elastic member 82 provided in the second space 68 between the second outer tube 65 and the second inner tube 56, and a third rubber-made elastic member 83 covering the outer tube connection section 71. The rubber-made elastic member 58 further includes a fourth rubber-made elastic member 84 covering an outer peripheral portion of the first outer tube 61, a fifth rubber-made elastic member 85 covering an outer peripheral portion of the second outer tube 65, and a sixth rubber-made elastic member 86 covering the outer tube protrusion section 75.

Further, as shown in FIG. 7, the first bush 21 is formed by the first rubber-made elastic member 81 being provided in the first space 64 between the first outer tube 61 and the first inner tube 55 and by the outer peripheral portion of the first outer tube 61 being covered with the fourth rubber-made elastic member 84. The first bush 21 is disposed in such a manner that the axis line 41 is oriented in a substantially vertical direction.

Further, as shown in FIG. 8, the second bush 22 is formed by the second rubber-made elastic member 82 being provided in the second space 68 between the second outer tube 65 and the second inner tube 56 and by the outer peripheral portion of the second outer tube 65 being covered with the fifth rubber-made elastic member 85. The second bush 22 is disposed in such a direction as to intersect (perpendicularly intersect) the first bush 21; namely, the axis line 42 of the first bush 21 is oriented in a substantially horizontal direction.

Further, as shown in FIG. 9, the outer tube connection section 71 is covered with the third rubber-made elastic member 83, so that the connection section 23 is constructed with the outer tube connection section 71 and the third rubber-made elastic member 83. The outer tube connection section 71 includes the upper and lower flat portions 72*a* and 73*a* connecting the first bush 21 to the second bush 22.

Further, as shown in FIGS. 4 and 5, the upper flat portion 72*a* and the lower flat portion 73*a* are disposed to extend in such a direction as to intersect the axis line 41 of the second bush 22 and parallel to the axis line 42 of the second bush 22. Thus, the upper flat portion 72*a* is disposed parallel to the opening portion 64*a* of the first space 64.

Figure 12:
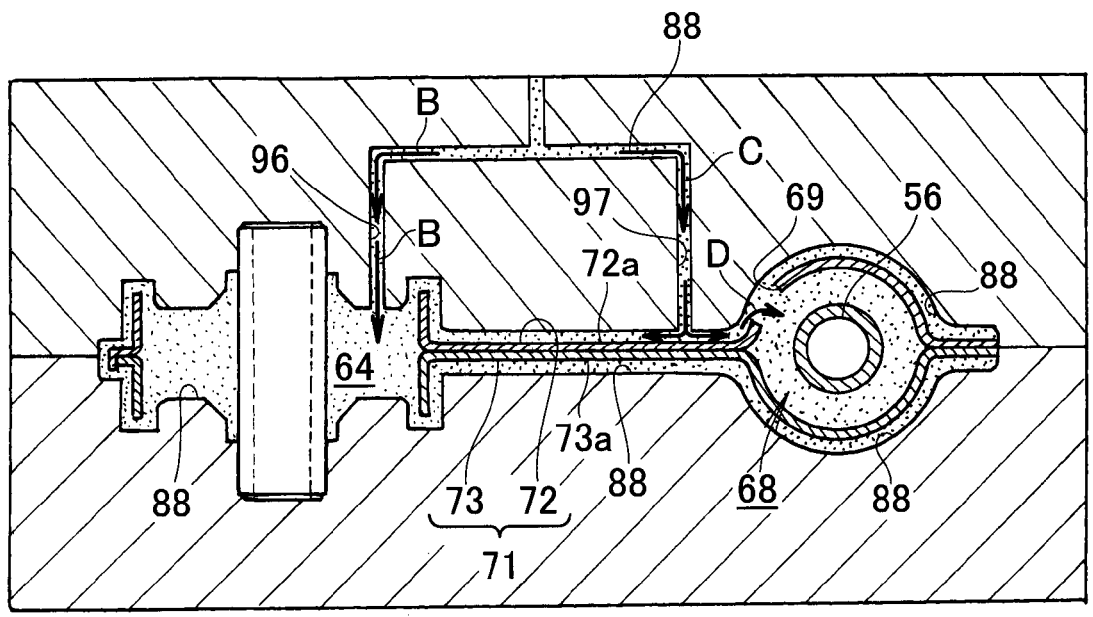
FIG. 12 is a view showing an example manner in which the upper and lower half members are covered with a rubber material in a state shown in FIG. 11.

In the aforementioned manner, the opening portion 64*a* of the first space 64 can be disposed opposed to the first runner 96 (see FIG. 12), but also the upper flat portion 72*a* can be disposed opposed to the first runner 96 (see FIG. 12). Thus, the rubber material 88 can be filled into the first space 64 (FIG. 12), but also directed to the upper flat portion 72*a*.

Further, because the rubber introduction opening 69 is provided near the upper flat portion 72*a*, the rubber material 88 guided to the upper flat portion 72*a* can be directed to the rubber introduction opening 69, through which it can be filled into the second space 68.

By the rubber material 88 being filled into the first and second spaces 64 and 68 as above, the first rubber-made elastic member 81 can be formed (molded) in the first space 64, and the second rubber-made elastic member 82 can be formed (molded) in the second space 68. In this manner, the torque arm 20 can be vulcanization-molded (molded by cross-linking) in which the axis line 41 of the first bush 21 and the axis line 42 of the second bush 22 extend in such directions as to intersect each other.

Such vulcanization-molding of the first rubber-made elastic member 81 and second rubber-made elastic member 82 can solidify the bond between molecules in each of the first and second rubber-made elastic members 81 and 82 but also increase the elasticity and tensile strength of the first and second rubber-made elastic members 81 and 82.

As shown in FIGS. 4 and 5, the outer tube protrusion section 75 is covered with the sixth rubber-made elastic member 86, so that the outer tube protrusion section 75 is integrally bonded together by the sixth rubber-made elastic member 86.

Next, with reference to FIGS. 10 to 13, a description will be given about an example manner in which the torque arm 20 is manufactured.

Figure 10:
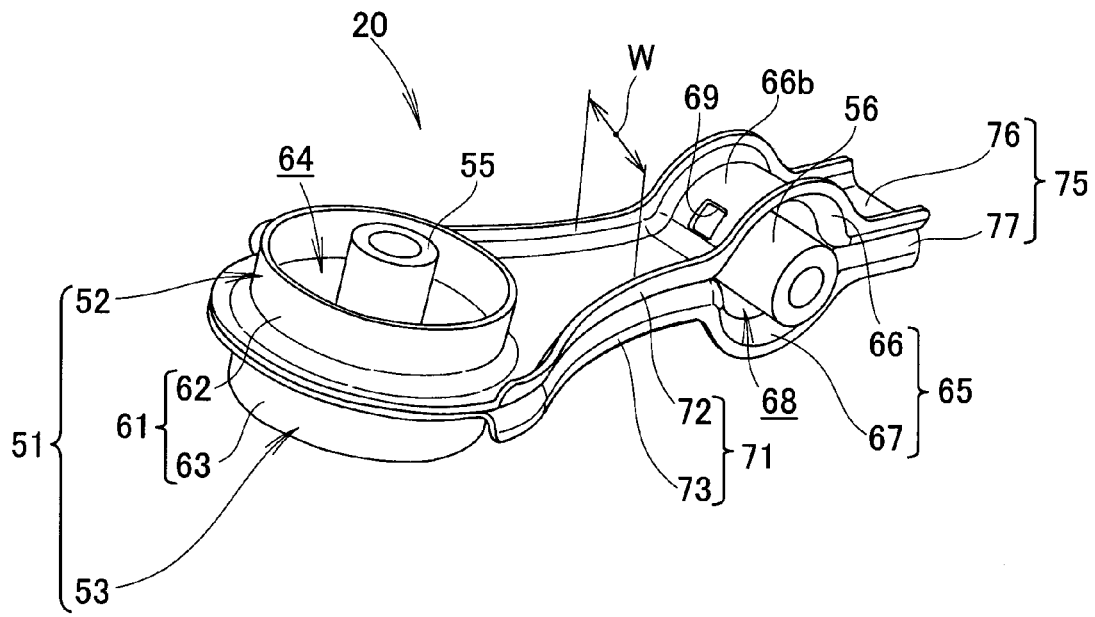
FIG. 10 is a perspective view of the torque arm when the torque arm is to be positioned in a mold with the upper and lower half members superposed on each other.

As shown in FIG. 10, the first outer tube 61, the second outer tube 65, the outer tube connection section 71 and the outer tube protrusion section 75 are formed by superposing the upper half member 52 and the lower half member 53 on each other. Then, the first inner tube 55 is disposed within and coaxially with the first outer tube 61, and the second inner tube 56 is disposed within and coaxially with the second outer tube 65.

Then, the upper and lower half members 52 and 53 superposed on each other with the first inner tube 55 disposed within the first outer tube 61 and with the second inner tube 56 disposed within the second outer tube 65 are positioned in a fixed mold member 91 of a mold 90. In this state, a movable mold member 92 of the mold 90 is moved closer to the fixed mold member 91 to clamp the mold 90, so that the upper and lower half members 52 and 53 and the first and second inner tubes 55 and 56 are positioned within a cavity 93 of the mold 90.

Figure 11:
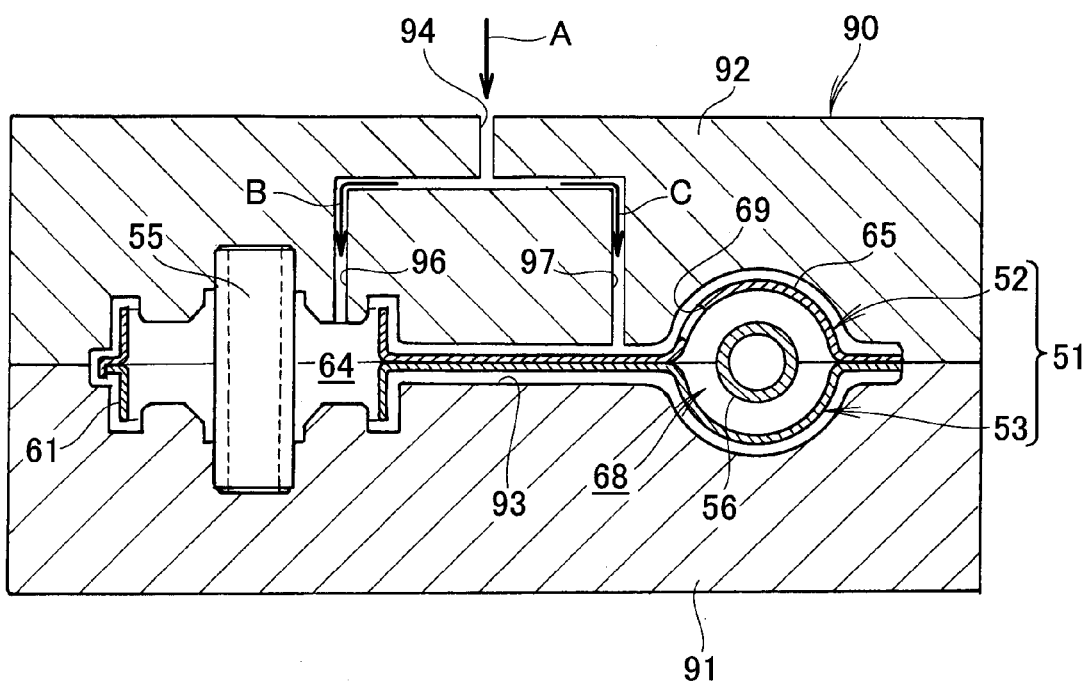
FIG. 11 is a sectional view showing the torque arm of FIG. 10 positioned in the mold.

Then, in the aforementioned state, the rubber material 88 (FIG. 12) is injected into an inlet 94 of the movable mold member 92, as indicated by arrow A in FIG. 11. Then, a portion of the rubber material 88 injected through the inlet 94 into the cavity 93 through the first runner (filling passage) 96 as indicated by arrow B in FIG. 11 while the remaining portion of the rubber material 88 is injected into the cavity 93 through the second runner (filling passage) 97 as indicated by arrow C in FIG. 11.

Further, as shown in FIG. 12, by the portion of the rubber material 88 being injected into the cavity 93 through the first runner 96 as indicated by arrow B, the rubber material 88 is filled into the cavity 93 (first space 64).

Further, by the remaining portion of the rubber material 88 being injected into the cavity 93 through the second runner 97 as indicated by arrow C, the rubber material 88 is injected toward the upper flat portion 72a of the upper outer tube connection section 72 in such a direction as to intersect the upper flat portion 72a. The outer tube connection section 71 is covered with the rubber material 88 injected through the second runner 97 into the cavity 93.

Further, by the rubber material 88 being injected toward the upper flat portion 72a of the upper outer tube connection section 72 in such a direction as to intersect the upper flat portion 72a, the rubber material 88 can be smoothly directed along the upper flat portion 72a to the rubber introduction opening 69. Then, the rubber material 88 is filled into the second space 68 through the rubber introduction opening 69 as indicated by arrow D in FIG. 2. Thus, the second rubber-made elastic member 82 (FIG. 13) is formed (molded) with the rubber material 88 having been filled into the second space 68.

As means for filling the rubber material 88 into the second space 68, it is conceivable to form a rubber material introducing passage between the upper outer tube connection section 72 and the lower outer tube connection section 73 and thereby permit communication between the first and second spaces 64 and 68 via the thus-formed rubber material introducing passage. With the rubber material introducing passage permitting communication between the first and second spaces 64 and 68, the rubber material 88 injected into the first space 64 can be directed into the second space 68 via the rubber material introducing passage.

As noted above, the upper outer tube connection section 72 and the lower outer tube connection section 73 each tapers in such a manner that the width dimension W (FIG. 10) of the respective upper or lower flat portion 72a or 73a decreases in the direction from the first bush 21 to the second bush 22. Further, the narrowed portion 72c (FIG. 6) is formed near the second upper outer tube 66, and the narrowed portion 73c (FIG. 6) is formed near the second lower outer tube 67. In addition, the above-mentioned rubber material introducing passage has a smaller width dimension than the flat portions.

Thus, the cross section of the flow passage of the rubber material introducing passage decreases in the direction from the first bush 21 to the second bush 22 and is particularly small in each of the upper and lower narrowed portions 72c and 73c. Therefore, it would be difficult to smoothly guide the rubber material 88, having been directed from the first space 64 to the rubber material introducing passage, toward the second space 68.

To avoid such an inconvenience, the instant embodiment of the torque arm 20 has the rubber introduction opening 69 formed in the introduction part 66b of the second upper outer tube 66 adjacent to the upper outer tube connection section 72. Thus, the rubber material 88 (FIG. 12) can be directed through the rubber introduction opening 69 into the second space 68. Thus, even in the torque arm 20 where the upper and lower flat portions 72a and 73a are formed to have a reduced width dimension W (FIG. 10), the rubber material 88 can be smoothly and reliably directed through the rubber introduction opening 69 into the second space 68.

Figure 13:
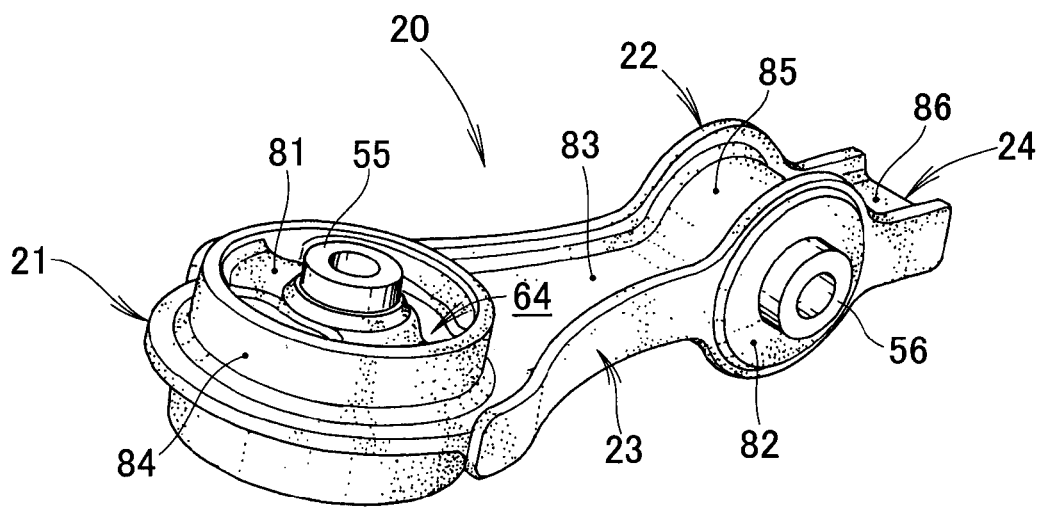
FIG. 13 is a perspective view of the torque arm completed after the upper and lower half members have been covered with the rubber material.

Further, as shown in FIG. 13, the first rubber-made elastic member 81 is vulcanization-molded in the first space 64 between the first outer tube 61 (FIG. 10) and the first inner tube 55 and the outer peripheral portion of the first outer tube 61 is covered with the vulcanization-molded fourth rubber-made elastic member 84, so that the first bush 21 is formed. Also, the second rubber-made elastic member 82 is vulcanization-molded in the second space 65 between the second outer tube 65 (FIG. 10) and the second inner tube 56 and the second outer tube 65 is covered with the vulcanization-molded fifth rubber-made elastic member 85, so that the second bush 22 is formed.

Further, the third rubber-made elastic member 83 is vulcanization-molded, so that the outer tube connection section 71 (FIG. 10) is covered with the third rubber-made elastic member 83. In this manner, the connection section 23 is formed with the outer tube connection section 71 and the third rubber-made elastic member 83. In addition, the sixth rubber-made elastic member 86 is vulcanization-molded, and the outer tube protrusion section 75 (FIG. 10) is covered with the sixth rubber-made elastic member 86. In this manner, the protrusion section 24 is formed with the outer tube protrusion section 75 and the sixth rubber-made elastic member 86.

In the aforementioned manner, the torque arm 20 can be manufactured by vulcanization molding, and the upper and lower half members 52 and 53 and the first and second inner tubes 55 and 56 can be firmly bonded together by means of the first to sixth rubber-made elastic members 81 to 88.

Figure 14:
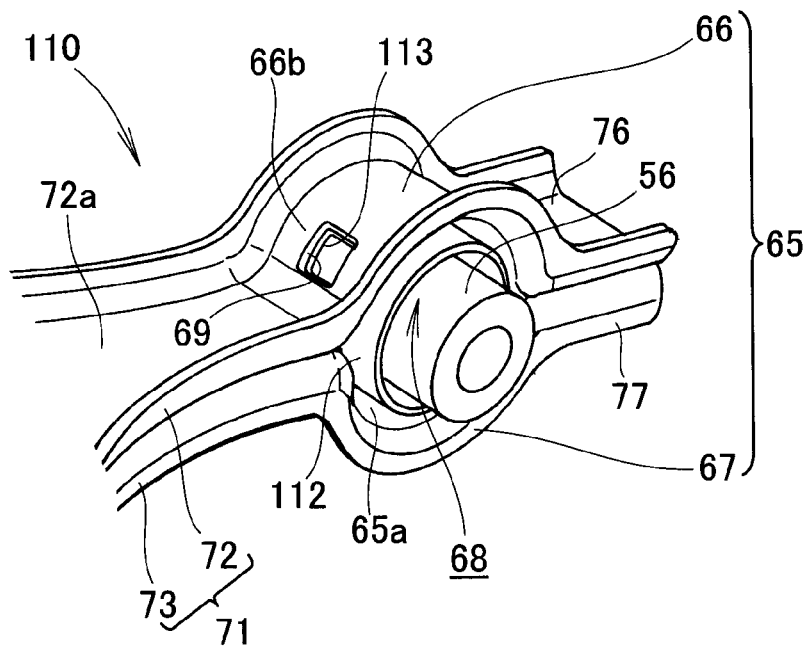
FIG. 14 is a perspective view showing a modification of the torque arm according to the preferred embodiment shown in FIG. 5.
Figure 15:
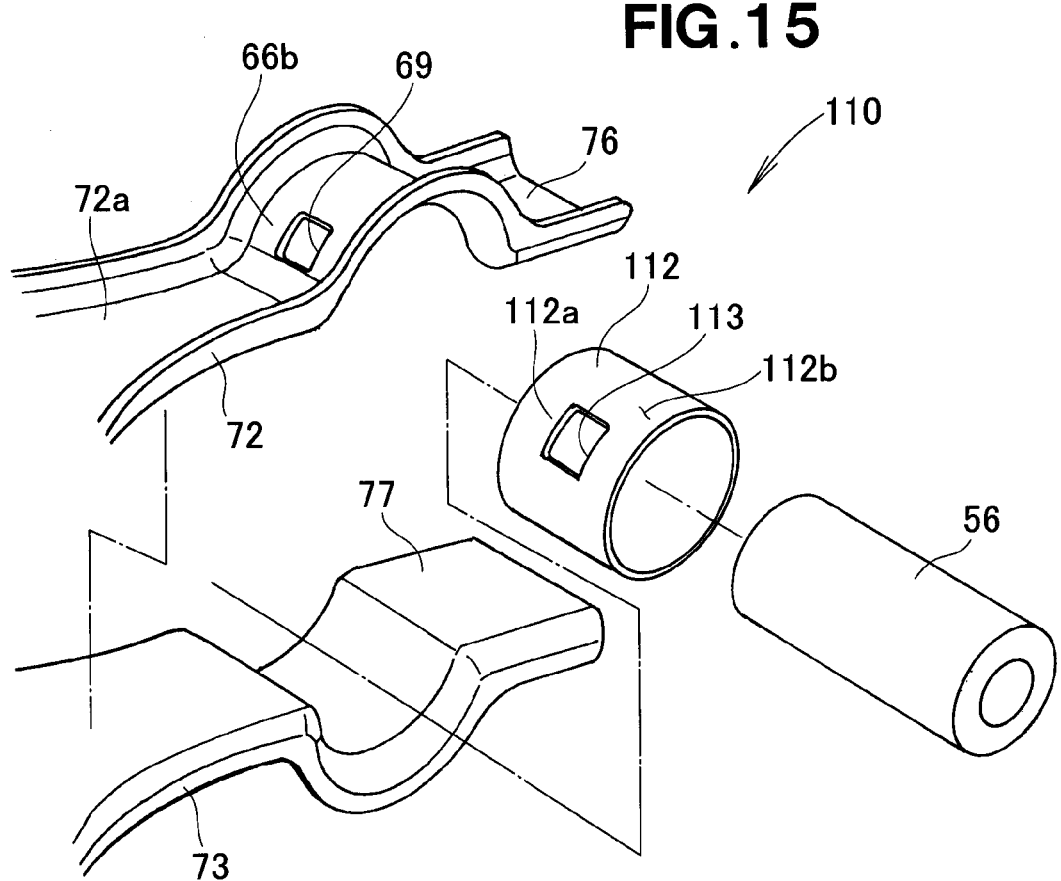
FIG. 15 is an exploded perspective view of the modification of the toque arm shown in FIG. 14.

The following describe, with reference to FIGS. 14 and 15, a modification (modified embodiment) of the above-described preferred embodiment of the torque arm 20. In the following description, elements similar to those of the embodiment of the torque arm 20 are indicated by the same reference numerals as used for the embodiment.

The modified torque arm 110 shown in FIGS. 14 and 15 is similar in construction to the above-described preferred embodiment of the torque arm 20, except that a reinforcing ring 112 is provided within and coaxially the second outer tube 65.

The reinforcing ring 112 is formed in a (circular) tubular shape in such a manner as to be disposed within and coaxially with the second outer tube 65. This reinforcing ring 112 has an introduction opening 113 formed in its part 112a opposed to the rubber introduction opening 69 of the second upper outer tube 66. The introduction opening 113 is formed in generally the same shape as the rubber introduction opening 69.

With the reinforcing ring 112 disposed within and coaxially with the second outer tube 65, the outer peripheral surface 112b of the reinforcing ring 112 is kept in contact with the inner surface 65a of the second outer tube 65. In this state, the rubber material 88 (FIG. 12) is filled into the second space 68 between the second outer tube 65 and the second inner tube 56. The second outer tube 65, the reinforcing ring 112 and the second inner tube 56 are integrally bonded by the rubber material 88 (i.e., second rubber-made elastic member 82) having been filled into the second space 68.

In the modified torque arm 110, the reinforcing ring 112 is provided within and coaxially the second outer tube 65, and thus, the second outer tube 65 can be reinforced with the reinforcing ring 112. By being reinforced with the reinforcing ring 112 like this, the strength of the second outer tube 65 can be increased even further.

In addition, because the introduction opening 113 in the reinforcing ring 112 is positioned opposed to the rubber introduction opening 69, the rubber material 88 directed along the upper flat portion 72a to the rubber introduction opening 69 can be then directed to the introduction opening 113 through the rubber introduction opening 69.

The rubber material 88 is filled through the introduction opening 113 into the second space 68. In this way, the second rubber-made elastic member 82 (FIG. 13) can be vulcanization-molded with the rubber material 88 filled into the second space 68.

It should be appreciated that the torque arm of the present invention is not limited to the above-described embodiments and may be modified variously. For example, whereas the embodiments of the torque arm have been described above in relation to the case where the first inner tube 55 of the first bush 21 is mounted to the front sub frame 13 while the second inner tube 56 of the second bush 22 is mounted to the power plant 19, the present invention is not so limited. For example, the first inner tube 55 of the first bush 21 may be mounted to the power plant 19, and the second inner tube 56 of the second bush 22 may be mounted to the front sub frame 13.

Further, whereas the embodiments of the torque arm 20 and 110 have been described above in relation to the case where the second bush 22 has the protrusion section 24, the present invention is not so limited, and such a protrusion section 24 may be dispensed with.

Furthermore, the shapes and constructions of the torque arm 20, 110, front sub frame 13, power plant 19, first bush 21, second bush 22, connection section 23, upper half member 52, lower half member 53, first inner tube 55, second inner tube 56, first outer tube 61, first upper outer tube 62, first lower outer tube 63, first space 64, second outer tube 65, second upper outer tube 66, second lower outer tube 67, second space 68, rubber introduction opening 69, outer tube connection section 71, upper and lower outer tube connection section 72 and 73, upper and lower flat portions 72a and 73a, upper and lower narrowed portions 72c and 73c, first rubber-made elastic member 81, second rubber-made elastic member 82, etc. are not limited to those shown and described above and may be modified as necessary.

Industrial Applicability:

The basic principles of the present invention are well suited for application to automobiles or automotive vehicles provided with a torque arm which connects a power plant, functioning as a power source, to the vehicle body to thereby prevent displacement of the power plant.

Legend:
20, 110 . . . torque arm (torque arm for automobile), 13 . . . front sub frame (vehicle body), 19 . . . power plant, 21 . . . first bush, 22 . . . second bush, 23 . . . connection section, 41 . . . axis line of the first bush, 42 . . . axis line of the second bush, 52 . . . upper half member (first half member), 53 . . . lower half member (second half member), 55 . . . first inner tube, 56 . . . second inner tube, 61 . . . first outer tube, 62 . . . first upper outer tube (one half section), 63 . . . first lower outer tube (other half section), 64 . . . first space, 65 . . . second outer tube, 66 . . . second upper outer tube (one half section), 66b . . . introduction part, 67 . . . second lower outer tube (other half section), 68 . . . second space, 69 . . . rubber introduction opening, 71 . . . outer tube connection section, 72 . . . upper outer tube connection section (one half section), 72a . . . upper flat portion (flat portion), 72c . . . upper narrowed portion (narrowed portion), 73 . . . lower outer tube connection section (other half section), 73a . . . lower flat portion (flat portion), 73c . . . lower narrowed portion (narrowed portion), 81 . . . first rubber-made elastic member, 82 . . . second rubber-made elastic member, 88 . . . rubber material, D1 . . . diameter of the first outer tube, D2 . . . diameter of the second outer tube

The invention claimed is:

1. A torque arm for an automobile comprises:
a first bush including a first rubber-made elastic member provided in a first space between a first outer tube and a first inner tube;
a second bush including a second rubber-made elastic member provided in a second space between a second outer tube and a second inner tube, the second bush extending in such a direction as to intersect the first bush, one of the first bush and the second bush being connected to a power source, other of first bush and the second bush being connected to a vehicle body of the automobile; and
a connection section including an outer tube connection section that connects the second outer tube of the second bush to the first outer tube of the first bush, the outer tube connection section having a flat portion extending in such a direction as to intersect an axis line of the first bush and disposed parallel to an axis line of the second bush,
characterized in that:
the first outer tube, the second outer tube and the outer tube connection section are each divided in two halves;
respective one halves of the first outer tube, the second outer tube and the outer tube connection section divided in two halves together constitute a first half member;
respective other halves of the first outer tube, the second outer tube and the outer tube connection section divided in halves together constitute a second half member;
the second outer tube has a rubber introduction opening formed in an introduction part thereof adjacent to the flat portion of the outer tube connection section, the rubber introduction opening being in communication with the second space; and
with the first half member and the second half member superposed on each other to thereby constitute the first outer tube, the second outer tube and the outer tube connection section, the outer tube connection section is covered with a rubber material fed to the flat portion of the outer tube connection section in such a direction as to intersect the flat portion, but also the rubber material is directed along the flat portion to the rubber introduction opening and filled into the second space via the rubber introduction opening, so that the second rubber-made elastic member is formed by the rubber material filled into the second space.

2. The torque arm according to claim 1, wherein the outer tube connection section is formed in such a manner that the flat portion has a narrowed portion formed therein near the second bush by gradually decreasing in width dimension in a direction from the first bush to the second bush.

3. The torque arm according to claim 1, wherein the second outer tube of the second bush is formed to have a smaller diameter than the first outer tube of the first bush, and wherein the second bush is connected to the power source and the first bush is connected to the vehicle body.

* * * * *